United States Patent [19]
Prudhomme et al.

[11] Patent Number: 5,649,316
[45] Date of Patent: Jul. 15, 1997

[54] IN-VEHICLE ANTENNA

[75] Inventors: Dennis C. Prudhomme, Bloomingdale; Eugene Propp, Evanston, both of Ill.

[73] Assignee: Elden, Inc., Elmhurst, Ill.

[21] Appl. No.: 406,111

[22] Filed: Mar. 17, 1995

[51] Int. Cl.[6] ................................. H05K 11/02
[52] U.S. Cl. ................ 455/345; 455/351; 455/575; 343/711; 343/807
[58] Field of Search ................ 455/345, 346, 455/347, 348, 349, 350, 351, 89, 90; 343/711, 712, 713, 795, 807, 806

[56] References Cited

U.S. PATENT DOCUMENTS

| | | | |
|---|---|---|---|
| 2,206,793 | 7/1940 | Staubly | 343/712 |
| 2,964,746 | 12/1960 | Trucnak, Jr. et al. | 343/713 |
| 3,090,960 | 5/1963 | Ingledew | 342/906 |
| 3,099,797 | 7/1963 | Piccinini | 325/312 |
| 3,816,837 | 6/1974 | Smith | 343/713 |
| 3,896,448 | 7/1975 | Killen et al. | 343/713 |
| 4,210,357 | 7/1980 | Adachi | 296/84 B |
| 4,675,687 | 6/1987 | Elliott | 343/715 |
| 4,760,394 | 7/1988 | Takeuchi et al. | 340/825.54 |
| 4,788,550 | 11/1988 | Chadima, Jr. | 343/712 |
| 4,905,270 | 2/1990 | Ono | 379/58 |
| 4,905,304 | 2/1990 | Bardon et al. | 455/89 |
| 5,027,128 | 6/1991 | Blaese | 343/713 |
| 5,285,210 | 2/1994 | Sato et al. | 343/713 |
| 5,343,214 | 8/1994 | Hadzoglou | 343/713 |
| 5,353,039 | 10/1994 | Tsukada et al. | 343/713 |
| 5,365,242 | 11/1994 | Shiina | 434/713 |

FOREIGN PATENT DOCUMENTS

| | | | |
|---|---|---|---|
| 2157633 | 10/1985 | United Kingdom | 343/711 |

*Primary Examiner*—Reinhard J. Eisenzopf
*Assistant Examiner*—Lee Nguyen
*Attorney, Agent, or Firm*—Thomas W. Tolpin

[57] ABSTRACT

A cellular telephone system has a special cellular telephone antenna that can be hidden from view so as to deter thieves and vandals as well as prevent damage to the antenna during car washes. In the preferred form, the cellular telephone antenna comprises a rear view mirror-mounted antenna. The cellular telephone antenna can also comprise a sun visor mounted antenna, side view mirror-mounted antenna, glove compartment-mounted antenna, or dashboard-mounted antenna.

11 Claims, 3 Drawing Sheets

IN-VEHICLE ANTENNA

BACKGROUND OF THE INVENTION

This invention pertains to antennas and, more particularly, to antennas for car phones.

Cellular mobile telephone service utilizes radio transmission to provide direct-dial telephone service to car phones in automobiles, vans, trucks, buses, and other vehicles. Since there are no overhead telephone lines which connect the vehicles, both speech and signaling are transmitted by radio waves. This is accomplished through the use of special tones rather than applying a voltage level or detecting a current as is done in overhead telephone lines. The tones will ring the mobile telephone to indicate an incoming call or will indicate a busy signal.

Until recent years, the growth of mobile telephones had been restricted due to the limited number of radio channels available and the limited range, i.e. 25–30 miles, of single base transmitting units. Subsequently, the cellular concept was developed to provide high quality mobile service for more customers at an affordable cost. The basic concept of a cellular system is to reduce the area covered by the transmitter by reducing the power of transmissions. In this manner, concentrated areas of population can have more transmitting stations and therefore, more channels because each transmitter handles numerous telephone conversations. Moreover, because the lower power transmitters cover less area, the same frequency can be reused in a common geographical area.

In a cellular system, the service area is divided into regions called cells. Each cell has equipment to switch, transmit, and receive calls to and from the mobile telephone units located in the cell. A typical cell can have a radius of one to 12 miles. Each cell transmitter and receiver operates on a specified channel. Desirably, each channel is used for many simultaneous conversations at locations which are far enough apart to avoid interference. As the number of mobile users grow, the overloaded cells can be split or divided into smaller cells by adding more transmitters.

Cell sites form the radio link between individual cellular telephones and the telephone system. Each cell station is equipped with a transmitter and receiver coupled to an array of antennas. The cell sites also have a telephone switching network and other support equipment. The cells are located where they will operate most effectively in the radio environment. In urban area, cell sites are usually found on top of the tall buildings. In rural areas, cell sites are located at the highest levels, such as on mountains or on radio towers. To minimize interference, adjacent cells use different frequencies.

The cell sites are interconnected and controlled by radio transmission by switching circuitry through a central mobile telephone switching office (MTSO). The MTSO is linked to the cell sites by a group of voice circuits for conversations, together with one or more data links for signaling and control. A call initiated by a mobile telephone unit can be interconnected by the MTSO to a stationary telephone just as any other telephone call.

The mobile telephone units have a telephone control unit, a handset, a mobile telephone antenna, and interconnecting cables. Each mobile telephone unit is assigned a ten digit telephone number. The control unit performs all the functions associated with normal telephone use. The receiver and transmitter provide a transceiver and they are the means by which signals are sent between the cellular telephone and the cell site. The receiver can tune to frequency modulated (FM) channels assigned to the cellular system, such as in the 800–900 MHz range. The band from 824–849 MHz is often used to receive signals from the mobile units. The transmitter can tune to the appropriate FM band. The band from 869–894 MHz is often used to transmit signals to the mobile units. The mobile units transmits at a low power. The base station transmits at a higher power.

Generally, each cellular telephone has a small integrated circuit or chip providing a numeric assignment module (NAM). The NAM chip is programmed usually by the cellular telephone dealer or installer to contain the information that uniquely identifies the cellular telephone with a cell site. The information programmed in the NAM chip includes the telephone number and serial number of the cellular telephone. The computers at the MTSO and the cell site use this information to identify the particular cellular telephone when transmitting and receiving calls.

Most cellular telephone manufacturers and supplies offer hands-free accessories that make it unnecessary to hold the handset while talking on the cellular telephone. A typical hands-free installation, includes a small microphone, which clips onto the windshield's sun visor to pick up the driver's end of the conversation and a speaker in the control head of the cellular telephone. Removing the handset from its cradle restores the cellular telephone to its normal operation and deactivates the microphone external speaker (speaker phone) to end the hands-free mode.

When the handset is lifted or a button is pressed to place a call, the MTSO automatically selects an available channel. The user hears the normal dial tone and can continue dialing, i.e. pressing the alpha/numeric buttons, in the same manner as a stationary telephone with overhead telephone lines. An incoming call to the mobile unit is signaled by a ringing tone and is answered simply by lifting the handset or pressing the receive button. The mobile telephone transmitter is linked by a voice channel to another telephone, such as another mobile telephone or a stationary telephone.

Each cell site has at least one setup channel dedicated to signal between the cell and its mobile units. The remaining channels are for conversations. Two channels are required for duplex operation. A mobile telephone unit is called by transmitting its number over the setup channel. This occurs when the cellular telephone is taken off-hook. The cellular transmitter links to an available set-up channel and send a request tone to the serving cell site. The cell site assigns a voice channel set over which dialing and voice signals will take place. The cellular control circuit automatically switches to the voice channel. The cell site interprets incoming dial tones and send the digits along to the MTSO which will connect the cellular telephone to the recipient telephone. When the recipient telephone is taken off-hook, the telephone are linked and a conversation can take place. As vehicles move (roam) out of the cells and the cellular signal becomes weaker, the MTSO switches to another cell to establish a new voice channel with a stronger signal, by a switching procedure known as a handoff. Handoffs take place so rapidly by a computerized switching system, that cellular users do not even know that it has occurred.

In most mobile cellular phone installations, the phone receives its power from a vehicle battery. If it is part of a permanent installation, the phone may be permanently connected, or hard wired, to the vehicle's electrical system. If the phone is intended to be removed occasionally, a quick disconnect plug or an adapter that lets the telephone take its power from the vehicle's cigarette lighter can be used.

For permanent installations, the transceiver/logic unit can be mounted in the trunk of the automobile and connected to the control head and car battery by cables. This location also places a trunk-mounted transceiver close to a rear trunk-mounted antenna. This arrangement shortens the length of feedline cable connecting the rear antenna to the transceiver. Generally, the shorter the feedline cable in cellular telephones, the stronger the transmission and the better the reception.

An antenna is a length of wire that radiates or captures radio signals. Without an antenna, the cellular telephone would be virtually useless since the telephone would have no means to transmit and receive signals to and from a cell site. Because of the microwave frequencies utilized in cellular telephones, it is possible to make the cellular telephone antennas quite small. Cellular telephone antennas come in many shapes and sizes. Some antennas are intended for permanent mounting and some for easy removal. Some are intended for vehicle use and others are to be attached to a portable phone. Some antennas are mounted on metal. Other antennas are mounted on glass.

An antenna typically needs a ground plane to provide a surface to launch radio waves, even though there is no electrical connection between it and the antenna. A ground plane should have a radius equal to at least one quarter of the wavelength of the radio wave. Since the frequencies used by cellular telephone wavelengths are quite short, very little in the way of a ground plane is needed. Generally for an antenna to radiate an omnidirectional signal, i.e. one that radiates outwardly in all directions from the antenna, the antenna should be mounted as close to the center of the ground plane as possible.

Roof-mounted antennas are secured to the roof of the vehicle. Metal roofs provide a convenient ground plane. The roof is also the highest point on the vehicle so that signals emitted from and transmitted to the antenna are less likely to be obstructed by nearby objects. The roof-mounted antenna can be connected to the internal dome light on the ceiling. The cable can then be placed in the ceiling liner for connection to the telephone. Roof-mounted antennas require a hole in the roof. Roof-mounted antennas usually extend at least a foot above the roof of the car. Roof-mounted antennas are not very popular with automobile drivers because they can be easily damaged by low garage doors and car washes. Roof-mounted antennas are not very popular with truck drivers because they can be readily damaged by low overpasses. Furthermore, roof-mounted antennas are not easily accessible for removal or repair.

Trunk-mounted antennas can be mounted on the trunk of an automobile through a hole in the trunk or with a clip that attaches to the edge of the trunk. The cable can be positioned in the space between the trunk and the body of the car. The metal trunk provides the ground plane. Elevated feed antennas can also be used in which the signal is received into the antenna above its base.

Magnetic-mount antennas are intended for easy installation and removal on the roof or trunk lid of a car. The magnetic-mount antenna has a base with a powerful permanent magnet that holds base of the antenna firmly to the metal surface of the vehicle.

External glass-mounted antennas are mounted on the exterior surface of the vehicles's rear window. The external glass-mounted antenna have an antenna rod, base, and a mounting plate. The mounting plate is cemented to the rear window with a weatherproof adhesive or can be placed on the rear window with a suction cup. The base, which can also serve as a mounting plate, contains a circuit that substitutes for the metal ground plane that would otherwise be provided by the roof or trunk of the car. The other parts of the antenna are glued to the inside of the window directly opposite the outside portion. The signal transmitted to and from the external glass-mounted antenna are coupled through the glass by capacitive action, which allows a current to develop between the two section of the antenna system without any physical connection between them. The coaxial cable is connected to the inner portion of the external glass-mounted antenna and extends into the vehicle's rear deck to the telephone. The efficiency of external glass-mounted antennas can be adversely effected by the rear window defogger and rear window heating elements. External glass-mounted antennas are useful but do not perform as well as roof-mounted antennas.

External cellular antennas typically have a pigtail or squiggle providing a phasing coil partway up its length. The phasing coil serves to divide the antenna into two antennas: one above the phasing coil and one below the phasing coil. The phasing coil is designed to maintain the proper phase relationship of the radio waves received by the antenna so that each half of the antenna receives the proper portion of the signal. A 5 dB antenna usually has two phasing coils or pigtails to properly distribute the signal.

The efficiency of external antennas can be adversely effected by external weather conditions, e.g. ice, snow, sleet, rain, winds, smog. Furthermore, external antennas can be readily bent, broken, or otherwise damaged in car washes. External antennas are also attractive to thieves since external antennas are readily accessible and can be easily removed with proper tools. Sometimes, external antennas are broken in parking garages and parking lots by vandals.

In-vehicle antennas mount inside the vehicle. In-vehicle rear window antennas can be secured to the inside surface of the rear windows of vehicles but peel-back double sided tape or by Velcro tabs. The rear window antennas are mounted vertically in the center of the rear window, but can also be attached instead to the front or side windows. In-vehicle antennas perform almost as well as external glass-mounted antennas.

It is, therefore, desirable to develop an improved cellular telephone system and antenna for use in vehicle which overcomes most, if not all, of the preceding problems.

SUMMARY OF THE INVENTION

An improved cellular telephone antenna and cellular telephone system is provided for use with vehicles. The novel antenna and cellular telephone system are attractive, economical, reliable and effective. The inventive antennae and telephone system are useful in many types of vehicles, such as: automobiles, station wagons, vans, trucks, jeeps, taxicabs, buses, motorcycles, all-terrain vehicles, road-grading equipment, backhoe, tractors, and agricultural vehicles.

The cellular telephone system has a vehicle antenna-housing connected to the vehicle. The cellular telephone antenna is secured to the antenna-housing. A coaxial cable connects the antenna to the cellular telephone. The cellular telephone has a transceiver with a handset and is connected to a battery in the vehicle. Remarkably, the placement and shape of the cellular telephone antenna and housing described herein decrease telephone interference and improve reception and the strength of the telephone signals, because a shorter coaxial cable is used to connect the telephone to the antennae.

In the preferred form, the cellular telephone antenna is an in-vehicle antenna positioned in an in-vehicle antenna-housing in the interior of a vehicle. Desirably, the antenna provides a disguise antenna which is hidden from view to make the antenna less visible and accessible to thieves and vandals and, therefore, minimizes antenna theft. Since the anti-theft antenna is encased in a protective housing, it cannot be bent, broken, or otherwise damaged in car washes. Advantageously, the in-vehicle antenna is not contacted and adversely effected by external weather conditions, e.g. ice, snow, sleet, rain, winds, smog.

The novel antenna is also less obstructive to the passengers and provide a greater unimpaired range of vision for the driver. Furthermore, the cellular telephone antenna enhances the aesthetic appeal and ambiance of the vehicle.

In one preferred embodiment, the in-vehicle antenna-housing comprises a rear view mirror. In another embodiment, the in-vehicle antenna-housing comprises a glove compartment. In a further embodiment, the in-vehicle antenna-housing comprises a sun visor positioned above the front windshield in proximity to a driver or passenger above a front seat of the vehicle. This is particularly useful for hands-free operation, where a small microphone is clipped, pinned or otherwise secured onto the windshield's sun visor to pick up the driver's end of the conversation. In this manner, the sun visor is already connected to the electrical system of the vehicle. In still another embodiment, the in-vehicle antenna-housing comprises a dashboard.

In some circumstances, it may be desirable that the vehicle housing comprises a side view mirror mounted externally on the side of the car adjacent a car door, either on the driver side or the passenger side. Remotely operated power-moveable side mirror are particularly adaptable for cellular telephone antennas, since they are already connected to the electrical power source of the vehicle, e.g. the car battery.

While it is preferred that the antenna be encased in the housing, it may be desirable in some circumstances that the antennae which extends externally upwardly from the mirror housing or other antenna-housing.

A more detailed explanation of the invention is provided in the following description and claims.

DETAILED DESCRIPTION OF THE PREFERRED EMBODIMENTS

Figure 1:
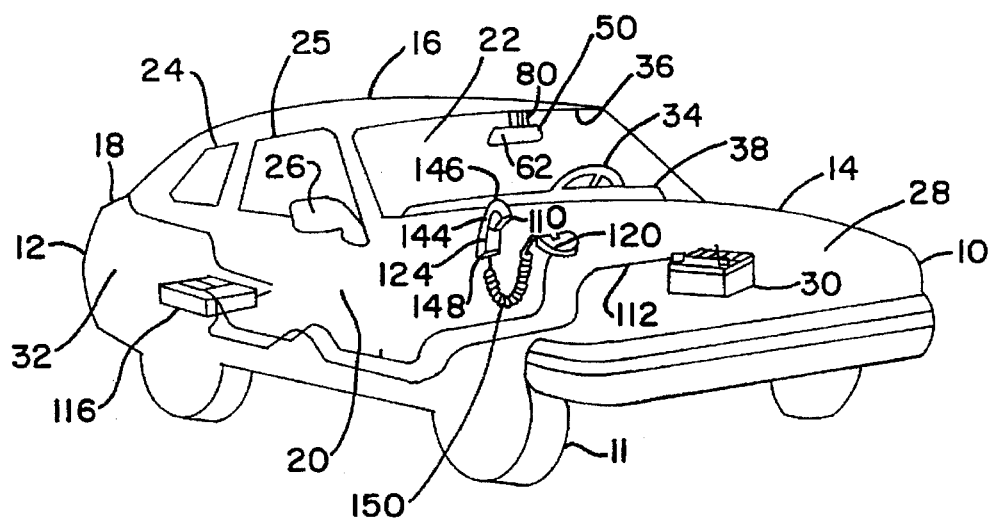
FIG. 1 is a diagrammatic view of a vehicle with a cellular telephone system in accordance with principles of the present invention.
Figure 2:
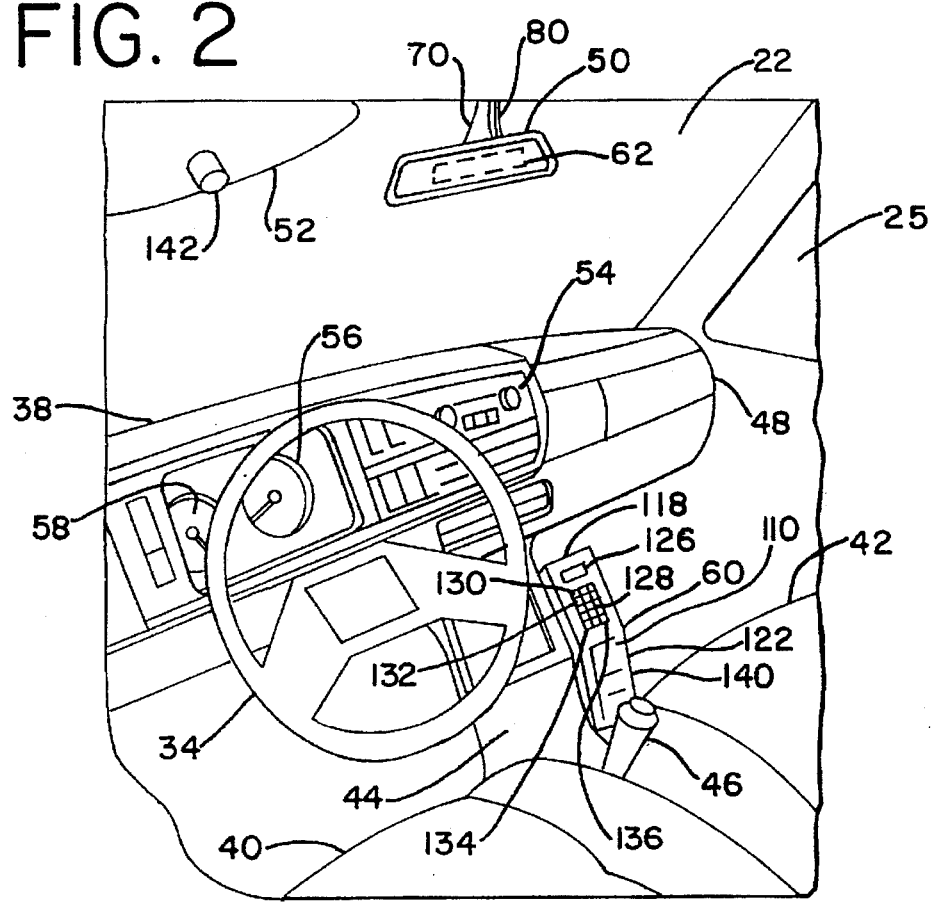
FIG. 2 is a diagrammatic view of the interior of the vehicle.

The vehicle 10 shown in FIGS. 1 and 2 illustrates an automobile with: tires 11; an exterior body 12 having a hood 14, roof 16, trunk 18, doors 20; front windshield 22 (front window), side windows 24 and 25, side view mirrors 26, an interior engine compartment 28, vehicle battery 30, trunk compartment 32, a steering wheel 34, ceiling 36, dashboard 38, driver's seat 40 (FIG. 2), front passenger seat 42, center console 44, drive shift 46, glove compartment 48, rear view mirror 50, sun visor 52, AM/FM radio 54, speedometer 56, tachometer 58, and cellular telephone system 60. While the particular vehicle shown is an automobile, it is to be understood that the inventive cellular telephone system and antenna can be used with other types of vehicles, such as: station wagons, vans, trucks, jeeps, buses, motorcycles, all-terrain vehicles, road-grading equipment, backhoes, tractors and other agricultural vehicles.

Figure 5:
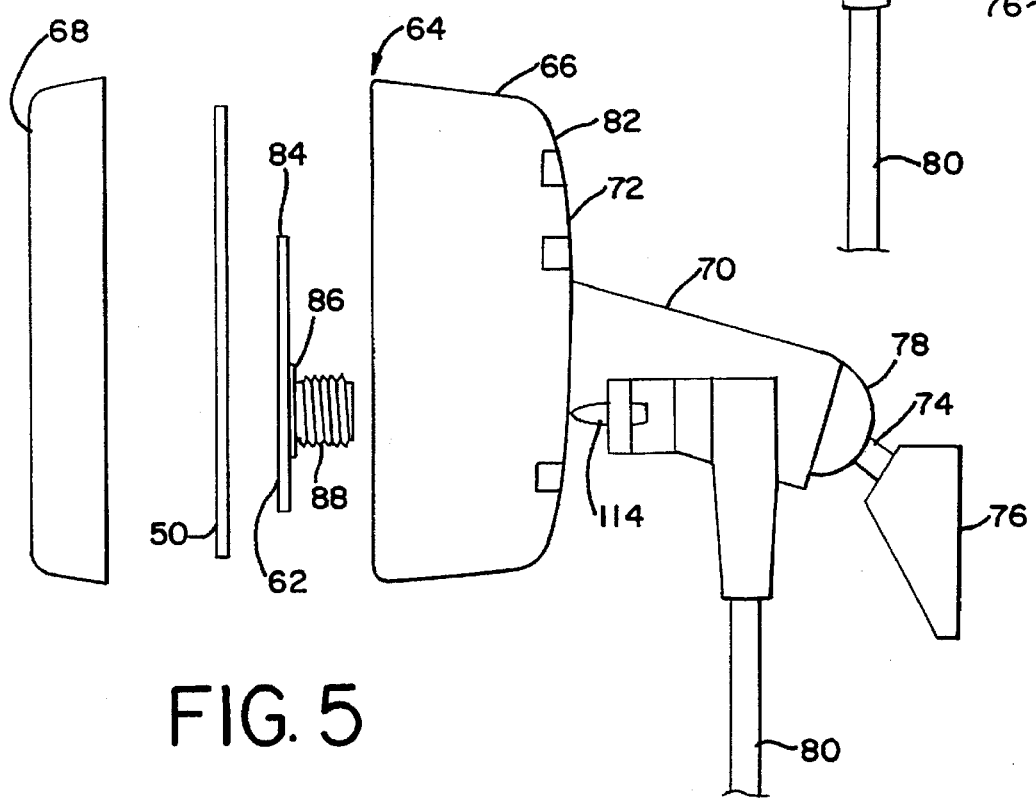
FIG. 5 is an exploded view of the rear view mirror housing with an internal cellular telephone antenna.

The cellular telephone system has a cellular telephone antenna 62 (FIGS. 5 and 6) which is secured by a clip, screw, or other fasteners to a vehicle antenna-housing 64. The antenna can extend externally upwardly or outwardly from the vehicle antenna-housing.

In the preferred embodiment, the antenna 62 is hidden from view and is encased and positioned within and surrounded by the vehicle antenna-housing 64. The vehicle antenna-housing can comprise: the sun visor, glove compartment, ceiling fabric, doors, rear view mirror, or side view mirror.

Preferably, the vehicle-antenna housing is an in-vehicle antenna-housing assembly comprising a rear view mirror housing 64. The rear view mirror housing can be made of plastic, preferably impact-resistant plastic. If desired, metal, wood or other materials can be used.

Figure 3:
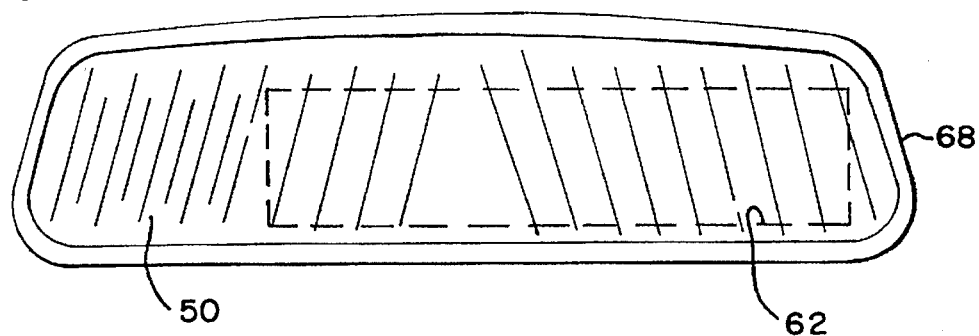
FIG. 3 is a front view of a rear view mirror.
Figure 4:
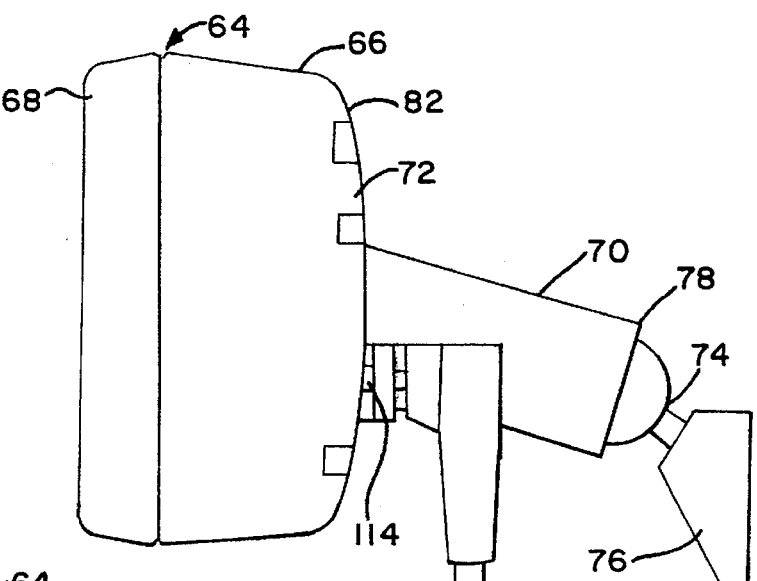
FIG. 4 is a side view of a rear view mirror housing.

The rear view mirror housing 64 (FIGS. 4 and 5) has a rear housing portion 66 which matingly engages and is secured to a front housing portion 68. A rear view mirror 70 (FIGS. 3 and 4) is clipped, bonded, or otherwise securely fastened to and peripherally surrounded by the front mirror portion. The rear view mirror is located at a position for viewing by the driver of the vehicle. The rear view mirror can be made of glass and coated with silver or other reflective coating. In some circumstances, it may be desirable that the mirror be made of reflective plastic or polished metal.

An extension arm 70 (FIGS. 4 and 5) providing a mirror-mounting arm is securely fastened or otherwise connected to the back 72 of the rear housing portion. A universal swivel joint 74 connects the extension arm to a mounting plate 76 or mounting bracket. The mounting plate is bolted or otherwise secured to the ceiling of the vehicle or windshield. The extension arm, swivel joint, and mounting plate provide an articulated arm 78 which enables the mirror housing and mirror to be moved 360 degrees to position desired by the driver so that the driver can view rearwardly approaching vehicles through the back window (rear windshield). In some circumstances, it may be desirable to use a hollow or tubular extension arm and mounting plate so that the antenna-cable 80 can extend through and be hidden from view in the hollow or tubular extension arm and mounting plate.

The back of the rear housing can have one or more mirror-housing windows 82 facing the front windshield at a location above or below the extension arm. The mirror-housing windows permit light, radio waves, and telephone signals to enter and exit the interior of the rear housing. The mirror-housing windows communicate with the front windshield and cellular telephone antenna within the mirror housing so that radio wave and telephone signals can pass through the front windshield and mirror-housing windows and be received by and radiate from the cellular telephone antenna. In some circumstances, it may also be desirable to have mirror-housing windows in the sides of the mirror housing facing the side windows.

The rear view mirror housing can also contain dimming circuitry to vary the reflectiveness of the mirror in response to the intensity of light from rearwardly approaching vehicles, as well as for daytime and nighttime driving.

The omnidirectional in-vehicle cellular telephone 62 antenna comprises a mirror-mounted cellular telephone antenna securely mounted and positioned in the interior of the rear view mirror housing behind the rear view mirror. The antenna can be positioned horizontally or vertically.

The antenna is tuned to receive and transmit telephone signals. More specifically, the antenna transmits telephone signals along a frequency modulated band to another telephone. The antenna also receives telephone signals from another telephone along frequency modulated channels. The antenna can also be tuned to receive AM radio signals and FM radio signals for the AM/FM radio.

The cellular telephone antenna can be made of copper or other conductive metal. The antenna is adhesively or thermally bonded or otherwise secured and mounted to a generally planar or flat light-transmissive antenna-board 84 (FIG. 6) or circuit board. The board can be made of plastic and can be transparent or translucent to facilitate the passage of radio wave and telephone signals to the antenna. The antenna is soldered or connected by conductive metal or wires to the base 86 (FIG. 5) or annular rim of the cable-connecting socket or adapter 88, that is bonded or otherwise secured to the board. The adapter 88 can be positioned rearwardly or forwardly to facsilitate attachment to the coaxial cable 80.

Figure 6:
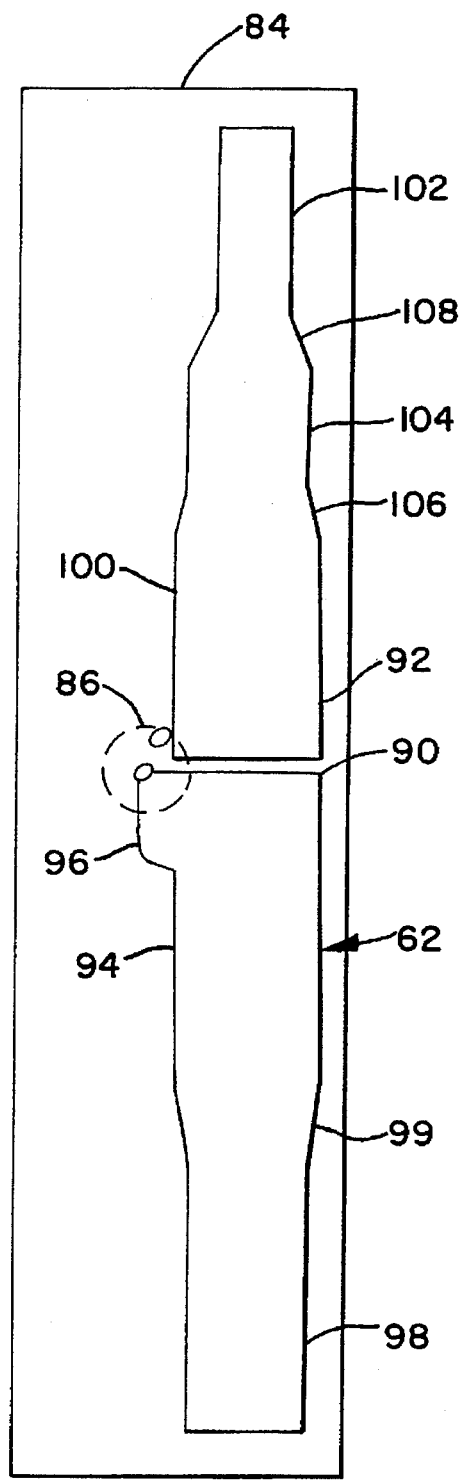
FIG. 6 is an enlarged front view of the cellular telephone antenna mounted on an antenna-board.

In the illustrative embodiment, the cellular telephone antenna has aligned outwardly-diverging flared antenna sections 90 and 92 (FIG. 6). The antenna sections are tapered away from the center of the antenna and antenna-board. The cross sectional area of each flared antenna section increases stepwise towards the center of the antenna and antenna-board. One antenna section 90 has a thicker inner antenna portion 94 with a transversely extending central foot portion 96 and has an elongated thinner outer portion 98 connected by an inwardly diverging frustro-conical tapered portion 99 to the thicker inner antenna portion 94. The inner antenna portion 94 is thicker, i.e. has a larger cross section, than the outer antenna portion 98. The other antenna section 92 has a thicker, but shorter, inner antenna portion 100, a much thinner outer antenna portion 102, and an intermediate thickness antenna portion 104 between the inner and outer antenna portions. The intermediate antenna portion 104 is connected by inwardly diverging frustro-conical tapered portions 106 and 108 to the inner and outer antenna portions 100 and 102. The cross section area of the intermediate portion 104 is greater than the outer portion 102 but less than the inner portion 100.

The cellular vehicular telephone system includes: the antenna 62, cellular telephone 110 (FIGS. 1 and 2), coaxial feeder cable 80, and battery 30. The battery provides an electrical power source which powers the cellular telephone system. In the illustrative embodiment, a vehicle battery in the engine compartment is wired to the cellular telephone by power cable 112. The coaxial cable 80 connects the antenna to the cellular telephone. Desirably, the coaxial feeder cable and said mirror-mounted antennae have matching impedances to substantially minimize standing waves and loss of transmission power.

In the illustrated embodiment, an externally threaded antenna-connector 88 (FIG. 5) providing a cable adapter is secured to the board and electrically connected to the antenna. The antenna-connector has an interior port or opening and provides a female cable-receiving connector, plug, or adapter. The antenna-connector matingly engages and receives the L-shaped male connector 114 on the antenna feedline cable (coaxial cable).

The coaxial cable can comprises a center conductor surrounded by an electrical insulating layer and a shield of thin braided copper wire. The center conductor and shield are encased in another insulation layer. The antenna input impedance should match the antenna feeder cable to prevent standing waves and loss of transmission power. The L-shaped male connector on the coaxial cable is connected to the female connector 88 on the internal cellular antenna. The other male TNC connector on the cable is connected to the cellular phone transceiver 116.

The cable can also be connected to the AM and/or FM vehicle radio, either directly, or through a splitter connection, or by a separate cable connected to another adapted plug/socket on the board. The length of the cable can be hidden from view by running, positioning and burying the cable under the dashboard, car molding and fabric in the ceiling and/or door.

The illustrated rear view mirror-mounted antenna can also be used for: a visor-mounted antenna, a dashboard-mounted antenna, a side view mirror-mounted antenna, a door-mounted antenna, a glove compartment-mounted antenna. All of the above described antennas are useful as cellular telephone antennas and can also be connected to the AM and/or FM vehicle radio. While the illustrated antenna is preferred for reasons of economy and effectiveness, in some circumstances it may be desirable to use an antenna have a different shape and orientation.

The cellular vehicle mobile telephone has a telephone control unit 116 (FIG. 1), handset 118, and cradle 120. The telephone control unit comprises a transceiver and provides a logic unit. The cellular telephone can comprise an analog cellular telephone, digital cellular telephone, or preferably a dual mode cellular telephone that has both an analog capacity and a digital capacity of 832 radio frequency (RF) channels with 3 watts power. The telephone can transmit from 824–849 MHz and can receive from 969–894 Mhz. The cellular telephone can have a frequency stability of 2.5 PPM, a channel spacing of 30 KHZ, and a duplex spacing of 45 MHz. The cellular telephone can operate on a supply voltage of 11–16.5 volts with a current of 1.5 amps.

The transceiver can be mounted under the dashboard by a mounted bracket and bolts or other fasteners. If desired, the transceiver can be mounted under the driver's seat, front passenger seat, in the glove compartment, or in the trunk. The transceiver can contain an amplifier, demodulator, and circuitry for tuning to telephone signals received by said cellular telephone antenna, as well as carrier oscillators, amplifiers, and circuitry for transmitting telephone signals through the cellular telephone antenna. The transceiver can be contained in a black box, such as of 30 mm height×210 mm length×90 mm width and weighing about 0.7 kg. Other size and weight transceivers can be used.

The handset 118 (FIGS. 1 and 2) can include a handset-housing which can be molded out of impact-resistant plastic. The handset-housing can comprise two or more separable parts separated by a parting line for access into the interior of the handset. The handset housing can include a back 122 and a front 124.

The back of the handset has a convex shape and generally faces towards the driver when the telephone is not in use. When in use, the back of the handset fits comfortably in the palm of the user's hand. The upper portion of the back of the handset has a rectangular handset-display window 126 to indicate and display the telephone number being called/ dialed. The handset display-window is positioned to be readily viewed by the driver.

The back of the handset has a keypad 128 (FIG. 2) with finger-engageable, depressible, resilient keys 130 positioned below the display window. The keys can be rectangular or circular. The keys can include: alpha numeric buttons 132, a send/receive button 134, a clear/stop/end button 136, a recall button, a store button, and automatic dialing buttons for user-programmed stored telephone numbers.

A speaker 140 (FIG. 2) can be mounted in the back of the handset below the keys for handsfree telephone discussions in conjunction with a speaker-microphone 142 mounted on the sun visor or on the ceiling in proximity to the sun visor. The microphone can be hardwired to the cradle or base unit of the cellular telephone. The microphone wire can be hidden from view by running, positioning and burying the wire under the dashboard, car molding and fabric in the ceiling and/or door.

The front of the handset has a finger-grippable concave handle 144 (FIG. 1) which extends between and integrally connects the top earpiece 146 to the bottom mouthpiece 148. The handset can be 61 mm height×62 mm wide×200 mm length and a weight of about 0.4 kg. Other size and weight handsets can be used.

The earpiece can have a convex circular ear-engageable portion with earholes to receive the sender's voice from a diaphragm or other vibrating means which converts current and voltage in audible tones. The earpiece can be connected to a receiving-circuit within the interior of the handset to receive telephone signals from other telephones via the transceiver, coaxial cable, and antenna, to unscramble and convert telephone signals into recognizable audible tones for the listener's ear.

The mouthpiece can comprise an inclined, sloped, or recessed portion with mouthpiece holes for transmission of the user's voice to a diaphragm or other vibrating means which convert acoustical vibrations (words) into electrical impulses, i.e. voltage and current. The mouthpiece can be connected to a transmitting-circuit within the interior of the handset to transmit telephone signals via the transceiver, coaxial cable, and antenna, to scramble and convert the user's voice/talking into telephone signals for transmission to the receiving telephone.

The bottom of the handset has a cord-receiving opening which provides a port or socket to receive a handset-engaging plug, adapter, and/or connector, attached to a telephone cord 150. The other end of the telephone cord has a base-engaging plug, adapter, and/or connector which matingly engages and fits into a port or socket in the base unit or cradle 120 of the telephone.

The cradle 120 or base unit is shaped complementary to the earpiece of the handset to receive at least the earpiece of the handset. The earpiece can snap-fit into the cradle or can be removably secured to the cradle by a magnet or other connection means. The base unit also has a cable-receiving opening which provides a port or socket to receive a male connector, plug, and/or adapter, attached to antenna-feed cable (coaxial cable). The base unit can also have a socket or adapter to receive the microphone wire. The base unit can be hard wired to the transceiver. The base unit and/or transceiver is operatively connected to the vehicle battery by a power cable or electrical power circuit.

EXAMPLE

An in-vehicle antenna was installed in the interior of a rear view mirror of a vehicle and was connected by a coaxial cable to the cellular telephone. The transmission and reception was clear and strong and produced unexpected surprisingly good results. The mirror was located above the center of the dashboard and was attached to the ceiling or interior surface of the roof. The in-vehicle antenna had the following specification:

| | |
|---|---|
| Frequency: | 800–930 MHz |
| VSWR | Less than 1.9:1 |
| Impedance: | 50 ohms (normal) |
| Gain: | 3 DB |
| Maximum Power: | 50 watts |
| Polarization | Multi-directional circular base |
| Connector: | Polytetrafluroethylene (Teflon) insulated TNC-P |
| Cable: | RG/u, 4.25 meters coaxial cable |
| PC Board: | G10, FR4, copper tinted 7" × 1.75" PCB |

Among the many advantages of the cellular telephone system and antenna are that they: (1) enhance the aesthetic appeal of the vehicle; (2) prevent damage to antennas in car washes; (3) hide the antenna from vandals and thieves; (4) minimize blockage of vision for the driver and passengers and thereby promotes vehicle safety; provide (5) outstanding appeal to customers and cellular telephone users; are (6) versatile; have (7) outstanding performance; (8) superior quality; are (9) easy to use; (10) convenient; (11) attractive; (12) economical; (13) reliable; (14) efficient; and (15) effective.

Although embodiments of the invention have been shown and described, it is to be understood that various modifications and substitutions, as well as rearrangements of parts and components can be made by those skilled in the art without departing from the novel spirit and scope of this invention.

What is claimed is:

1. A cellular telephone system for use in vehicles, comprising:

a vehicle antenna-housing connected to a vehicle;

a telephone antenna secured to and encased and positioned within and surrounded by the vehicle antenna-housing;

said telephone antenna having substantially planar aligned outwardly-diverging telephone antenna sections, each telephone antenna section having a cross section increasing stepwise towards a central portion of the telephone antenna;

a cellular telephone having a transceiver comprising a handset;

a power supply comprising a vehicle battery connected to the cellular telephone; and a coaxial cable for connecting the telephone antenna to the cellular telephone.

2. A cellular telephone system in accordance with claim 1 wherein:

said vehicle housing comprises an in-vehicle antenna-housing positioned in the interior of a vehicle;

one of said telephone antenna sections having a thicker inner antenna portion; a central foot portion extending transversely from said thicker inner antenna portion, an elongated outer portion, an inwardly diverging frustro-conical tapered portion connecting said outer portion to said inner portion, and said inner portion having a larger cross section than said outer portion; and another of said telephone antenna sections having a shorter, inner telephone antenna portion, a thinner outer, telephone antenna portion, and an intermediate telephone antenna portion integrally extending between the shorter inner telephone antenna portion and thicker outer telephone antenna portions, inwardly diverging frustro-conical tapered portions connecting said shorter inner telephone antenna portion and thicker outer antenna portions, and said intermediate telephone antenna portion having a cross section larger than said thicker outer telephone antenna portion but less than said shorter inner telephone antenna portion.

3. A cellular telephone system in accordance with claim 2 wherein:

said in-vehicle antenna-housing comprises a rear view mirror; and said antenna comprises a rear view mirror-mounted antenna.

4. A cellular telephone system in accordance with claim 2 wherein:

said in-vehicle antenna-housing comprises a glove compartment; and said antenna comprises a glove compartment-mounted antenna.

5. A cellular telephone system in accordance with claim 2 wherein:

said in-vehicle antenna-housing comprises a sun visor positioned above the front windshield in proximity to a driver or passenger in a front seat of the vehicle; and said antenna comprises a sun visor-mounted antenna.

6. A cellular telephone system in accordance with claim 2 wherein:

said in-vehicle antenna-housing comprises a dashboard; and said antenna comprises a dashboard-mounted antenna.

7. A cellular telephone system in accordance with claim 1 wherein:

said vehicle housing comprises a side view mirror mounted externally on the side of the car adjacent a car door; and said antenna comprises a side view mirror-mounted antenna.

8. A cellular telephone system in accordance with claim 1 including a radio operatively connected to said antenna, said radio being selected from the group consisting of an AM radio, an FM radio, and an AM/FM radio.

9. A cellular telephone system for use in vehicle, comprising:

an in-vehicle antenna-housing assembly comprising a rear view mirror housing having an interior, a rear housing portion secured to a portion of a vehicle in proximity to a windshield and a front housing portion connected to said rear housing portion, said vehicle being selected from the group consisting of an automobile, station wagon, van, truck, jeep, taxicab, bus, motorcycle, an all-terrain vehicle, road-grading equipment, backhoe tractor, and an agricultural vehicle;

a rear view mirror secured to and peripherally surrounded by said front mirror portion, said rear view mirror having being located at a position for viewing by the driver of the vehicle;

an in-vehicle cellular telephone antenna comprising a rear view mirror-mounted cellular telephone antenna disposed in the interior of said rear view mirror behind said rear view mirror, said cellular telephone antenna being secured to said rear view mirror housing for transmitting telephone signals along a frequency modulated band to another telephone and for receiving telephone signals from another telephone along frequency modulated channels;

a cellular telephone having a transceiver handset operatively connected to a transceiver, and a cradle operatively connected to the handset for receiving the handset;

a vehicle battery operatively connected to said cellular telephone;

a coaxial feeder cable for connecting said mirror-mounted antenna to said cellular telephone; and said coaxial feeder cable and said mirror-mounted antenna having substantially matching impedances to substantially minimize standing waves and loss of transmission power;

a substantially planar board disposed within and secured to said rear view mirror housing;

a cable-receiving socket mounted on said board for receiving said coaxial feeder cable;

said mirror-mounted cellular telephone antenna comprising a substantially planar conductive metal antenna mounted on said board and connected to said cable-receiving socket;

said telephone antenna having substantially planar aligned outwardly-diverging telephone antenna sections, each telephone antenna section having a cross section increasing stepwise towards a central portion of the telephone antenna;

one of said telephone antenna sections having a thicker inner antenna portion; a central foot portion extending transversely from said thicker inner antenna portion, and elongated outer portion, an inwardly diverging frustro-conical tapered portion connecting said outer portion to said inner portion, and said inner portion having a larger cross section than said outer portion; and another of said telephone antenna sections having a shorter, inner telephone antenna portion, a thinner outer telephone antenna portion, and an intermediate telephone antenna portion integrally extending between the shorter inner telephone antenna portion and thicker outer telephone antenna portions, inwardly diverging frustro-conical tapered portions connecting said shorter inner telephone antenna portion and thicker outer antenna portions, and said intermediate telephone antenna portion having a cross section larger than said thicker outer telephone antenna portion but less than said shorter inner telephone antenna portion.

10. A cellular telephone system in accordance with claim 9 including an extension arm and mounting plate for connecting said rear housing portion of said rear view mirror housing to said ceiling of said vehicle; and wherein said rear view mirror housing defines at least one mirror-housing window to permit telephone signals to enter and exit the interior of said rear view mirror housing, and said mirror-housing window communicating with cellular telephone antenna within the mirror housing and vehicle-window comprising a window selected from the group consisting of a front windshield and a side window, so that telephone signals can pass through the vehicle-window and mirror-housing window and be received by and radiate from the cellular telephone antenna.

11. A cellular telephone system in accordance with claim 9 wherein:

said transceiver handset has a front and a back;

said front of said handset having an earpiece, a mouthpiece, and a handle extending between and connecting said earpiece and said mouthpiece, said earpiece having a convex circular ear-engageable portion with earholes for receiving a telephone call, and said mouthpiece comprising an inclined portion with mouthpiece holes for transmission of the user's voice into electrical impulses;

said back of the transceiver handset having a handset-display window for displaying the telephone number being called, a keypad with finger-engageable keys positioned below said handset-display window, said keys comprising alpha numeric buttons, a send button and an end button; and said cradle being shaped complementary to said earpiece of said handset to receive said earpiece.

* * * * *